Dec. 31, 1968 L. W. BELEW 3,418,951

SECURITY FILE

Filed Sept. 30, 1966

INVENTOR.

Leland W. Belew

BY

Wood, Herron and Evans

ATTORNEYS

Dec. 31, 1968 L. W. BELEW 3,418,951

SECURITY FILE

Filed Sept. 30, 1966 Sheet 2 of 7

INVENTOR.

Leland W. Belew

BY Wood, Herron and Evans

ATTORNEYS

INVENTOR.
Leland W. Belew
BY
Wood, Herron & Evans
ATTORNEYS

INVENTOR.
Leland W. Belew
BY
Wood, Herron & Evans
ATTORNEYS

INVENTOR.
Leland W. Belew
BY
Wood, Herron and Evans
ATTORNEYS

Dec. 31, 1968 L. W. BELEW 3,418,951

SECURITY FILE

Filed Sept. 30, 1966 Sheet 6 of 7

INVENTOR.
Leland W. Belew
BY
Wood, Herron and Evans
ATTORNEYS

Dec. 31, 1968 L. W. BELEW 3,418,951

SECURITY FILE

Filed Sept. 30, 1966 Sheet 7 of 7

INVENTOR.
Leland W. Belew
BY
Wood, Herron and Evans
ATTORNEYS

United States Patent Office 3,418,951
Patented Dec. 31, 1968

3,418,951
SECURITY FILE

Leland W. Belew, Hamilton, Ohio, assignor to The Mosler Safe Company, Hamilton, Ohio, a corporation of New York Filed Sept. 30, 1966, Ser. No. 583,232
14 Claims. (Cl. 109—59)

ABSTRACT OF THE DISCLOSURE

A security file particularly resistant to surreptitious entry. The file comprises a rectangular cabinet having a pivotally mounted door on its front side. The door is securable by a combination lock controlled boltwork which consists of a rectangular linkage made from flat straps of material which are easily bent and distorted in the event of a forced attack on the boltwork. The lock is protected interiorly by a unique cover assembly which prevents surreptitious attack on the lock from the rear of the file cabinet. The cabinet per se incorporates a number of reversed bends to rigidify the cabinet and preclude spreading of the door jamb to gain unauthorized access to the interior of the file.

Figures 1, 2:
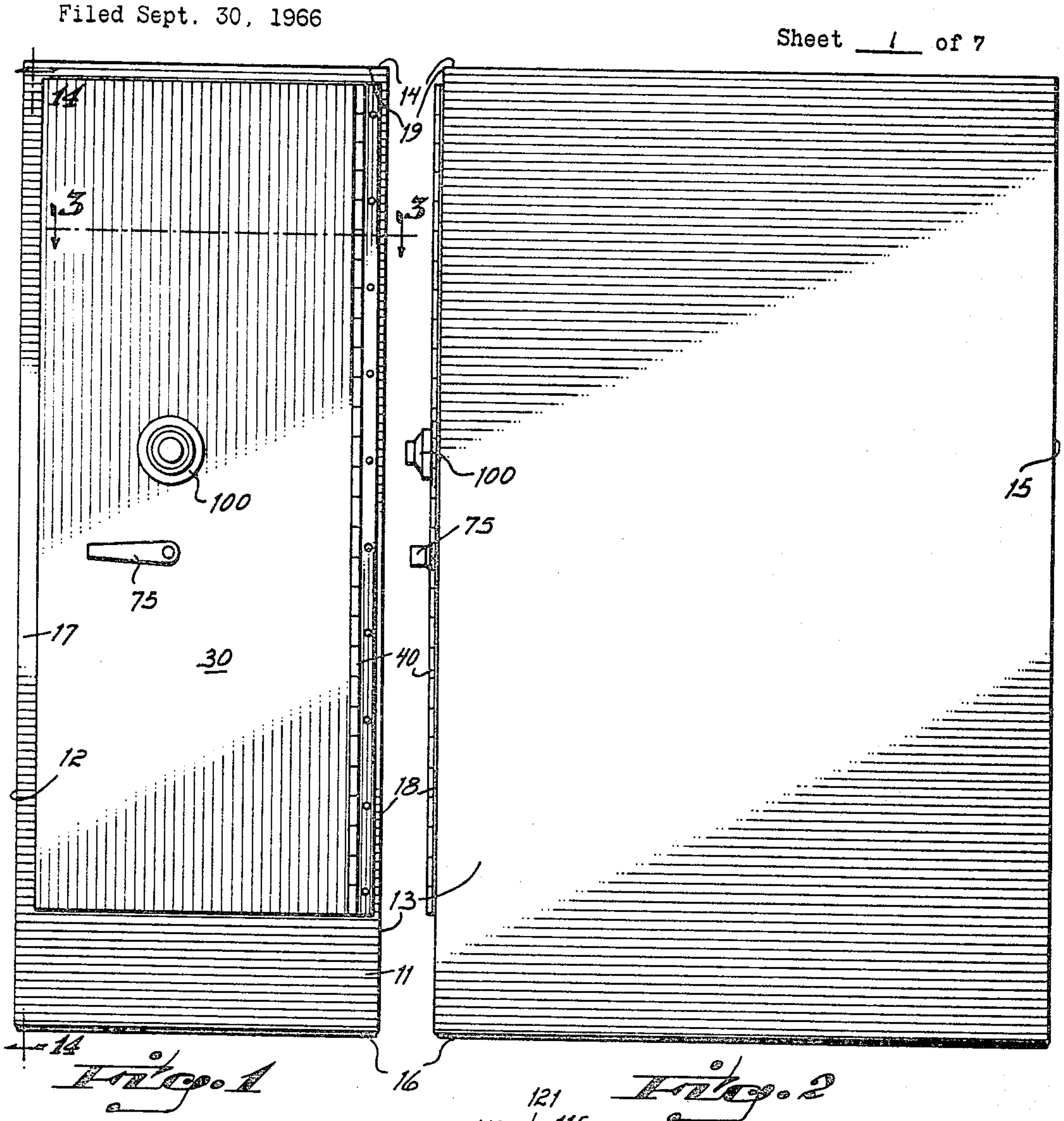

This invention relates to safes and, more particularly, to record or so called security files.

Security files are classified by the U.S. Government in accordance with the degree of security which they afford. Class 6 files, the class with which this invention is primarily concerned, are expected to withstand a thirty minute surreptitious entry attempt but are not intended to resist forced entry. A surreptitious entry is defined as an unauthorized entry made in such a manner as to leave no evidence of the act which would be readily discernible in normal use of the file.

It has been a primary objective of this invention to provide a security file which meets all specifications for a Class 6 security file and which is particularly resistent to surreptitious entry attempts.

Another objective of this invention has been to provide a security file which is inexpensive to manufacture and which affords a high degree of protection against undetected and unauthorized entry.

One aspect of this invention is predicated upon the concept of forming the boltwork which interconnects the door locking bolts and the door handle from a plurality of flat metal straps arranged in the configuration of a parallelogram. In order for this boltwork to operate satisfactorily or smoothly, the parallelogram linkage must be maintained in true and parallel relationship within close tolerances. These tolerances are easily established during manufacture but are also quickly distorted in the event of an attempt to force the boltwork of the safe open. Once distorted even slightly, this boltwork will no longer operate satisfactorily so as to permit the attack to go undetected within the meaning of a surreptitious attack.

Another aspect of this invention concerns protection against surreptitious entry through the back of the file and into the combination lock. One of the common methods of attacking a file surreptitiously is by cutting a relatively small hole in the back of the file cabinet through which access may be gained to the combination lock. Once the lock is reached from the interior of the cabinet, the combination can be learned and thereafter, the safe door may be opened at any time by proper manipulation of the lock. The small hole, of course, remains in the back of the file but since most files are placed up against a wall, the hole usually goes undetected for a relatively long time.

To protect against this type of attack by compromising the lock, the file of this invention comprises a lock which is contained in a metal enclosure having a liner of drill resistent material. One section or cover of the liner must be removable to permit the lock combination to be changed but the enclosure and liner are so constructed and interrelated that the door must be open, the boltwork must be in the locked condition, and a series of interlocks must be actuated before the cover can be removed.

Another aspect of this invention pertains to the file cabinet which is made from sheet metal so configurated as to maximize the strength and rigidity of the file. To this end, the cabinet top and side walls are made from a single sheet of metal having double return bends bent into the front corners to define a reinforced door jamb. This construction provides structural rigidity which is resistent to spreading of the door jamb to open the door as well as resistent to repair in a manner suitable for surreptitious entry.

The use of a single sheet of metal to form the top and side walls of the file cabinet provides a smooth contour exterior, but more importantly, it eliminates overlapping surfaces which are undesirable because they permit cover plates over entry holes to be concealed by abutting seams.

Figure 6:
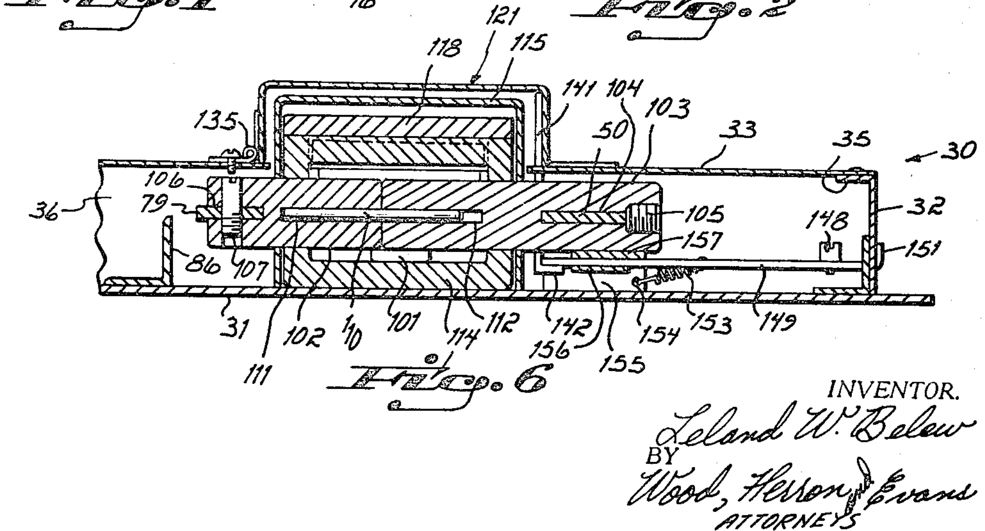
Figures 3, 4:
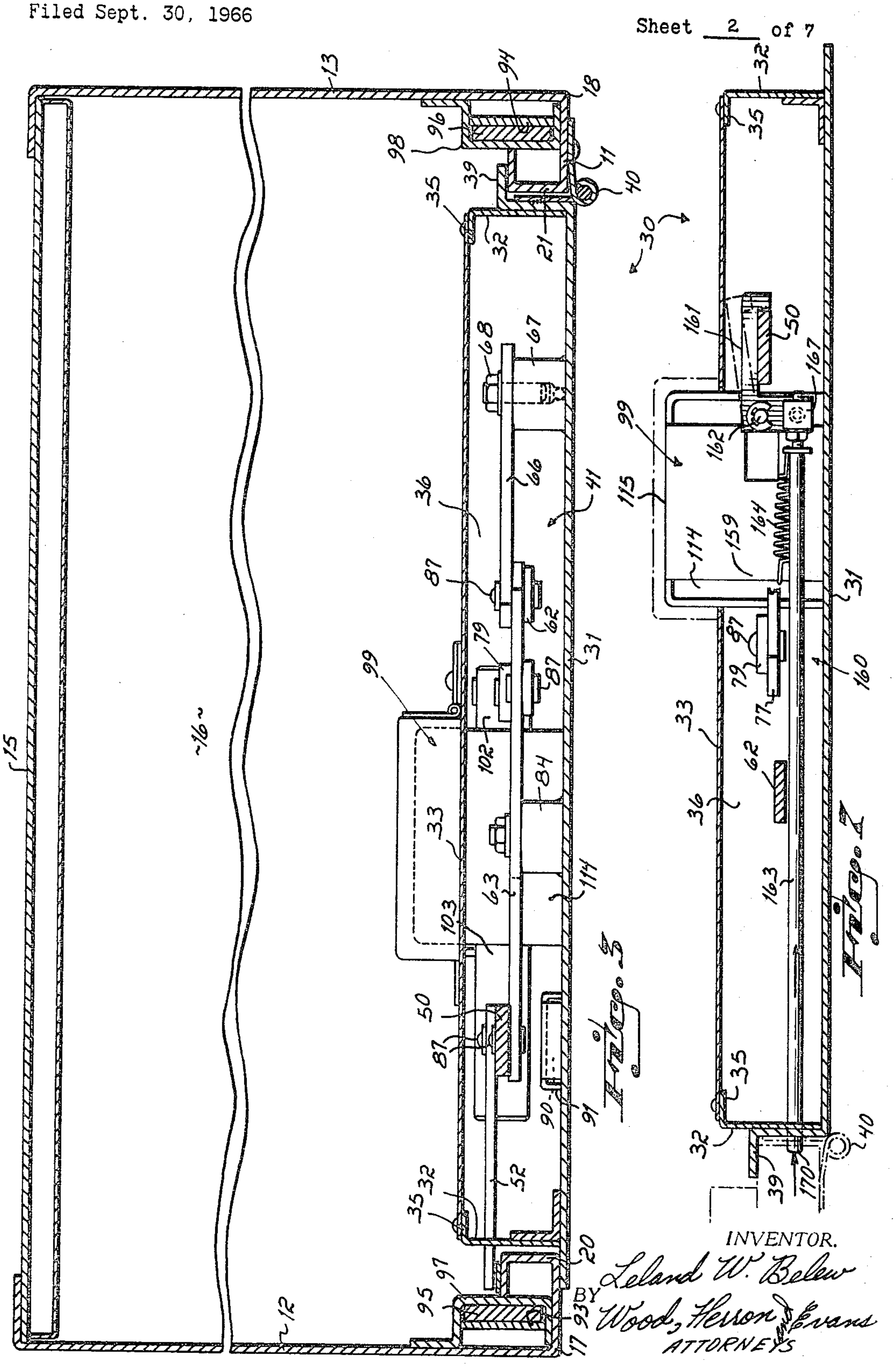
Figures 4, 8:
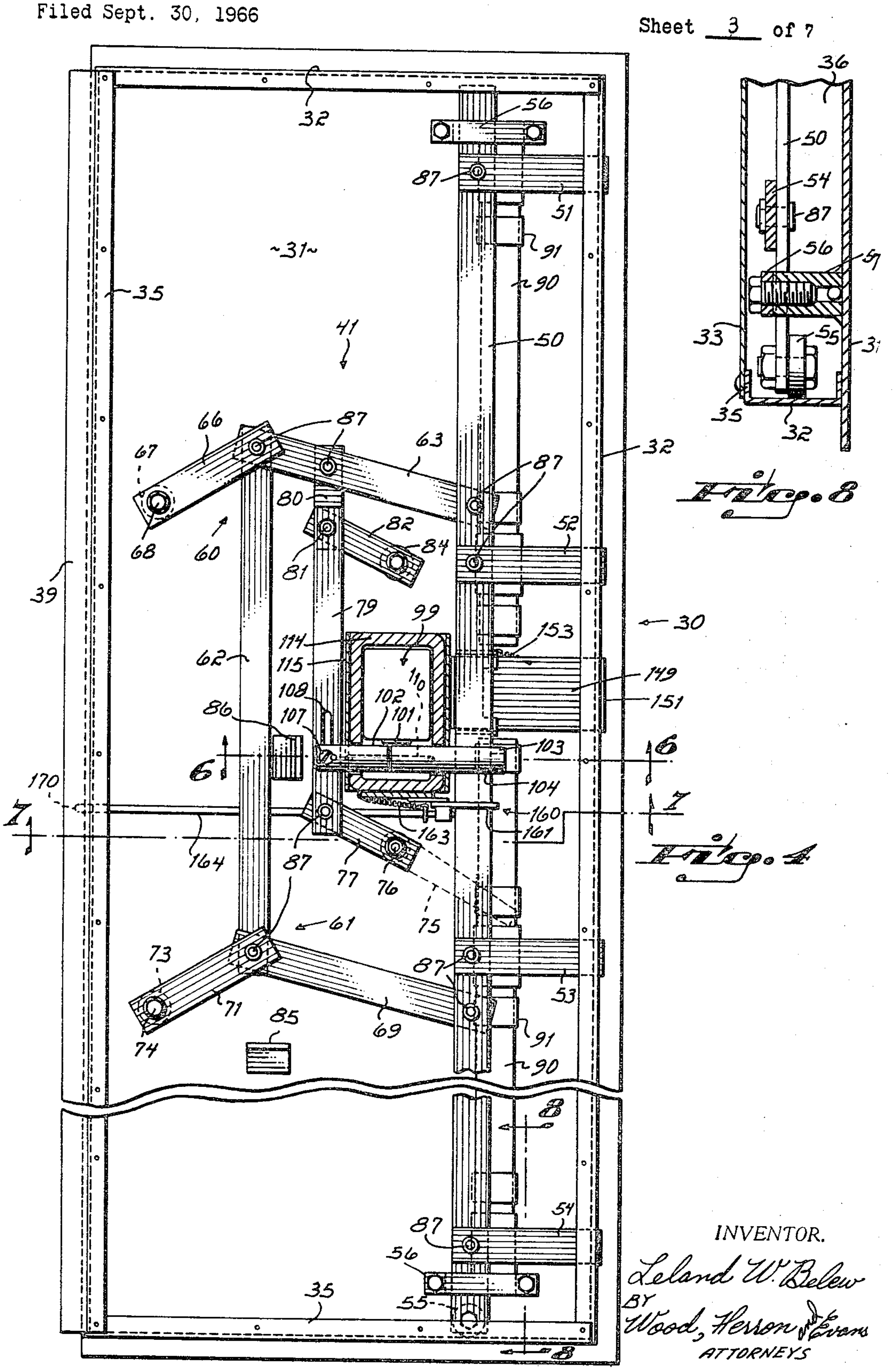
Figure 5:
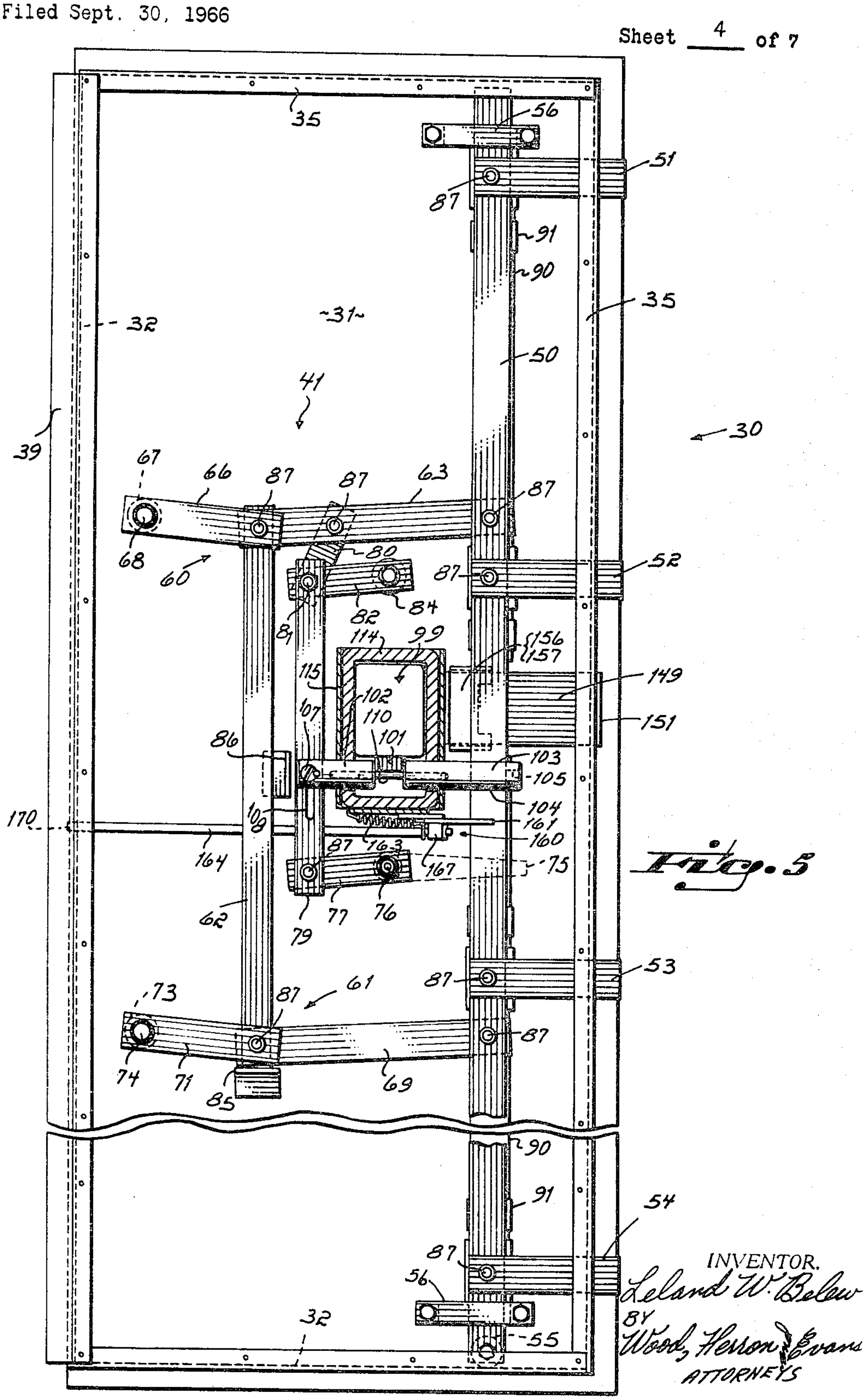
Figures 9, 10, 11, 12:
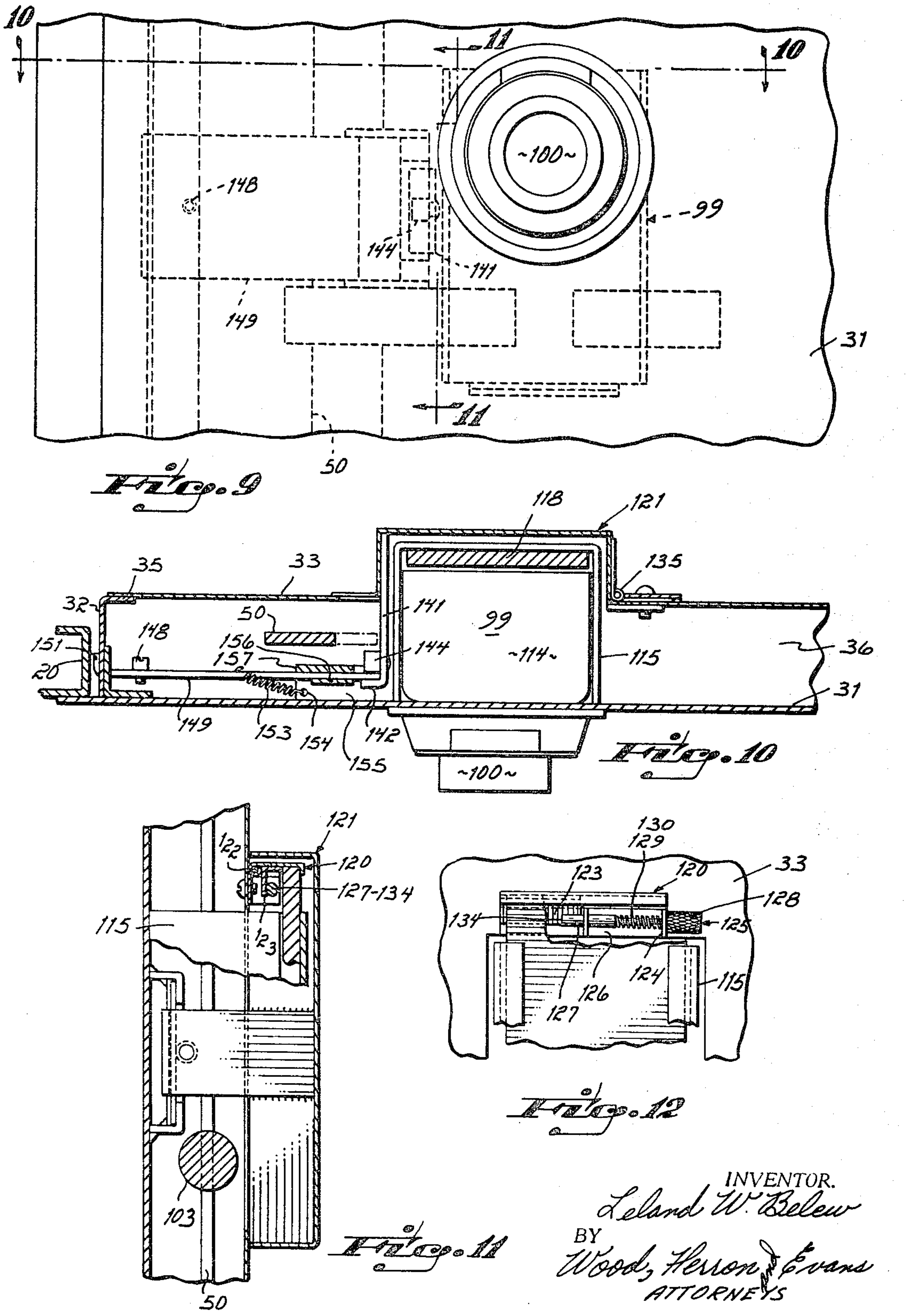
Figure 13:
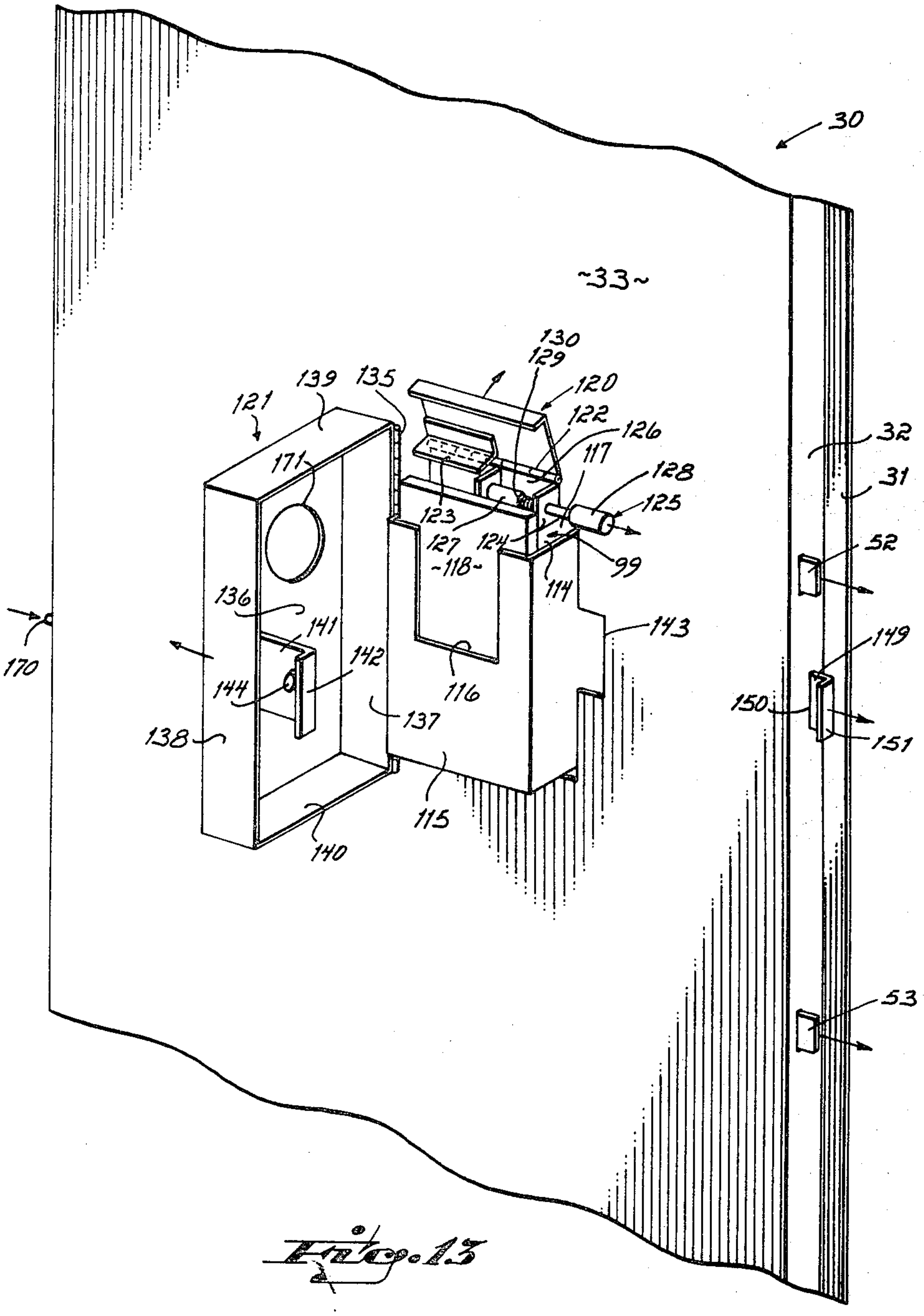
Figure 14:
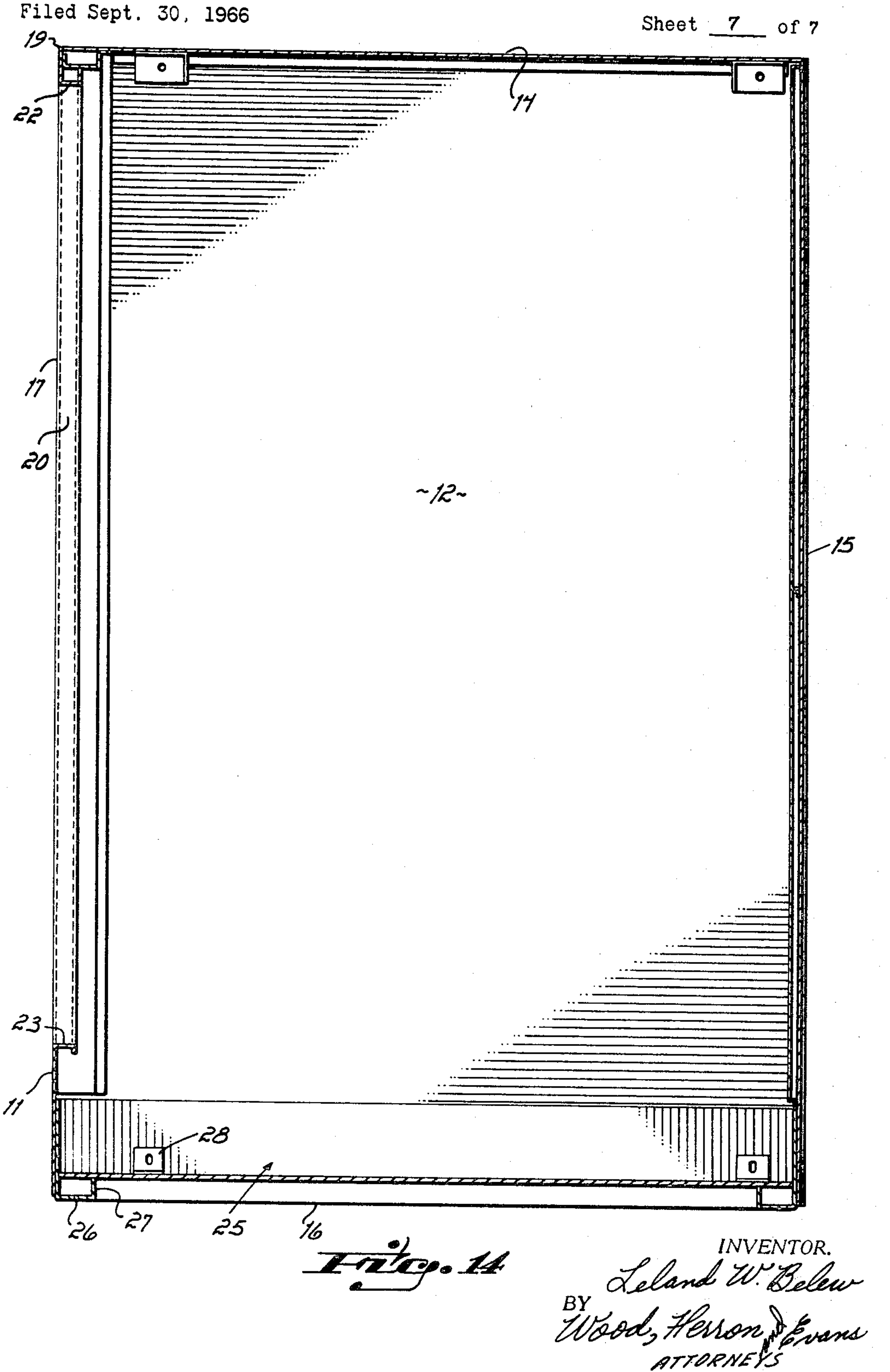

These and other objects and advantages of this invention will be more readily apparent from the following description of the drawings in which:

FIGURE 1 is a front elevational view of a security file incorporating the invention of this application, FIGURE 2 is a side elevational view of the file of FIGURE 1, FIGURE 3 is a cross-sectional view through the file taken along line 3—3 of FIGURE 1, FIGURE 4 is a rear elevational view of the security file door with the rear cover plate removed, the door boltwork being in the open position, FIGURE 5 is a view similar to FIGURE 4 but illustrating the boltwork in the locked condition, FIGURE 6 is a cross-sectional view through the door lock taken along line 6—6 of FIGURE 4, FIGURE 7 is a cross-sectional view through the door taken along line 7—7 of FIGURE 4, FIGURE 8 is a cross-sectional view of a lower portion of the door taken along line 8—8 of FIGURE 4, FIGURE 9 is a front elevational view of a portion of the file door including the combination lock, FIGURE 10 is a cross-sectional view of a portion of the door taken along line 10—10 of FIGURE 9, FIGURE 11 is a vertical cross-sectional view of a portion of the door taken along line 11—11 of FIGURE 9, FIGURE 12 is a rear elevation view, partially broken away, of the rear of the combination lock enclosure, FIGURE 13 is a perspective view of the rear of the combination lock enclosure, FIGURE 14 is a vertical cross-sectional view through the file taken along line 14—14 of FIGURE 1.

Referring first to FIGURES 1, 2, 3 and 14, it will be seen that the security file of this invention comprises a sheet metal cabinet having a front wall 11, a pair of side walls 12 and 13, a top wall 14, a rear wall 15, and a bottom wall 16. The two side walls 12 and 13 and the top wall 14 are made from a single integral sheet of metal while the front wall 11, rear wall 15 and bottom wall 16 are made as separate assemblies secured to the other adjacent walls by weldments.

As may be seen most clearly in FIGURES 3 and 14, the two side walls, 12, 13 and top wall 14 are all bent inwardly at 90° to form front corner 17, 18 and 19 sections on the cabinet. Each of these front corners sections 17, 18, and 19 are also bent rearwardly at 90° and outwardly at 90° again to form a double reverse bend door channel or door jamb 20, 21 and 22 respectively. The bottom of the door jamb is formed by a rearwardly and downwardly bent section 23 of the front plate 11.

This door jamb structure which results from the double reverse bends formed in the front of the side and top panel of the cabinet, forms a very rigid structure which is not easily bent or bowed in the event that someone tries to pry the locked door 30 open. If such an attack is made on this safe, the double reverse bend corner structure will crease rather than bend with the result that the corners will serve as a tell-tale of the attack and thus prevent a successful surreptitious entry.

The bottom of the cabinet is defined by a rectangular sleeve 25 welded to the bottoms of the side walls 12 and 13, the front wall 14, and rear wall 15. The lower edges of the sleeve 25 are all turned inwardly at 90° to form a floor rest surface 26 and are then turned upwardly at 90° to provide a vertical support 27 for the bottom stiffening plate 16. Right angle brackets 28 are welded in the corners between the sleeve 25 and the bottom plate 16 to secure the plate 16 in the bottom of the cabinet.

Referring now to FIGURES 3 and 4, it will be seen that the door 30 of the file 10 comprises a front plate 31 to which are fixedly attached rearwardly extending peripheral channels 32. Each of these channels 32 has a flange 35 bent inwardly at its rearwardmost end so as to define a chamber or recess 36 within which the boltwork and lock mechanism of the door is housed. A door cover plate 33 is attached to the flanges 35 of the channels 32 so as to enclose the chamber 36 of the door.

The front plate 31 of the door is bent rearwardly at 90° and then outwardly at 90° to form a dead bolt 39 along the hinged edge of the door. This dead bolt fits behind the double return bend 21 at the front of the side 13 of the cabinet to insure that the door cannot be opened by simply removing the hinges 40 which pivotally support the door on the cabinet.

The door boltwork, which controls locking and unlocking of the door, comprises a vertical carrying bar or strap 50 to which door bolts 51, 52, 53, and 54 are rigidly secured. The carrying bar 50, together with the attached bolts 51, 52, 53, and 54 are laterally movable upon rotational movement of a door handle 75 and consequent movement of a linkage system indicated generally at 41. To facilitate lateral movement, roller 55 is mounted for rotation on the lower end of the vertical strap 50 and is rotatable within and rollable over the inside surface of the bottom channel 32 of the door.

As may be seen most clearly in FIGURES 4, 5, and 8, the carrying bar 50 is laterally movable within guideways formed by transverse support straps 56 which are bolted at their ends to support posts 57. These posts 57 are in turn welded to the rear of the front door plate 31.

The linkage system 41, which controls lateral movement of the carrying bar 50, comprises a pair of toggle linkages 60, 61 which are interconnected by a vertical strap 62. The upper toggle linkage 60 comprises a pair of links 63, 66, one of which (63) is pivotally connected at one end to the vertical strap 50 and at the opposite end to one end of the second link 66 and to the strap 62. The second link 66 is pivotally connected at its other end to a pivot post 67 by a bolt 68. The second or lower toggle linkage 61 comprises a link 69 connected at one end to the carrying bar 50 and at its opposite end to one end of a second link 71 and to the lower end of strap 62. The opposite end of the second link 71 is connected to a fixed post 73 by a bolt 74.

Movement of the toggle linkages 60, 61 is controlled from the door handle 75 by a linkage system which includes a shaft 76, rotatable link 77, a vertical link 79, and a connecting link 80. The handle is connected by the shaft 76 to the rotatable link 77 such that rotation of the handle 75 effects rotation of the link 77. The link 77 is in turn pivotally connected to the lower end of the vertical link 79 which has its upper end pivotally attached to the lower end of the link 80, the upper end of which is pivotally attached to the upper toggle linkage 60. To further support the linkage system and assist in maintaining the parallelism of the links, a supporting link 82 is pivotally attached at one end to the pivotal connection 81 between the vertical link 79 and the connecting link 80. The opposite end of the supporting link 82 is pivotally supported upon a post 84 which is in turn attached to the back of the door front plate 31.

As may be seen most clearly by comparing FIGURES 4 and 5, rotational movement of the handle 75 effects vertical movement of the link 79 and thus moves the toggle linkages 60 and 61 between an angulated position (FIGURE 4) and a generally colinear position (FIGURE 5). When the toggle linkages are angulated, the vertical strap 50 is moved to its leftward extent as viewed in these figures, and when the toggles are extended, the vertical strap is moved to the right so as to cause the bolts 51, 52, 53, and 54 of the door to be extended into the locked position. To limit the rotational movement of the handle, a pair of stops 85 and 86 are attached to the rear of the front plate 31 of the door. One of these stops 85 is located in the downward path of movement of the vertical strap 62 and the other stop 86 is mounted in the horizontal path of movement of this strap 62.

All of the linkages elements 50, 62, 63, 66, 69, 71, 77, 79, 82 as well as the bolts 51, 52, 53, and 54 are made from long narrow and thin straps of sheet metal interconnected by rivets 87. An attack on the boltwork requires either a heavy forceful attack on a narrow but deep section or an attack on the narrow section in a direction normal to the plane of the door. Because the parts are all arranged in parallel and include a parallelogram linkage 50, 62, 63, 69, the parts must all remain parallel for ease of movement of the boltwork. Therefore, an attack on the narrow section of the boltwork will result in sufficient distortion and misalignment of the parallel elements that the boltwork will be difficult to operate and the attack will not be accomplished in a surreptitious manner.

To protect the boltwork against attack by drilling through the front of the file door, a strip of drill resistent material 90 is secured to the back of the front door plate 31 parallel to and immediately in front of the vertical strap 50 (when the strap is in its locked position). The strip 90 of drill resistent material cannot be welded to the door and therefore is secured to the door by straps 91 of weldable metal, the ends of which are welded to the back of the door.

To further protect the boltwork against attack from the sides of the cabinet, vertical strips 95 and 96 of drill resistent material are mounted in the front corners 17, 18 of the file cabinet. Since the drill resistent material cannot be welded, it is mounted in pockets in the form of channels 97, 98 which are welded within the double reverse bent sections of the front corners of the file. The strips 95, 96 are held in the channels 97, 98 by weldable straps 93, 94 of sheet metal.

A combination lock is mounted on the door and includes a lock mechanism 99 mounted interiorly of the door chamber 36 and a lock dial 100 mounted exteriorly of the door. When properly manipulated, the dial is operative to control a combination lock bolt 101 in the conventional manner. This bolt 101 is movable from an extended position (FIGURE 5) in which it extends between and separates two axially movable lock bars 102 and 103, one of which is attached to the vertical link 79, and the other of which is attached to the vertical carrying bar 50. In order for the boltwork to move to the open position, the bar 50 must move to the left as viewed in FIGURES 4 and 5 and in so doing, into endwise juxtaposition with respect to the bar 102. This of course requires that the lock bolt 101 must be out of longitudinal alignment with the lock bars 102 and 103 as shown in FIGURE 4.

One end of the lock bar 103 is provided with a vertical slot 104 within which the vertical carrying bar 50 is slidably mounted. The slot 104 is closed at the end by a set screw 105. The lock bar 102 is similarly provided at one end with a vertical slot 106 within which the vertical strap 79 is slidable. The strap 79 is connected to the bar 102 by a guide pin 107 which is mounted in the bar 102 and extends through a slot 108 in the strap 79 such that the strap 79 may move vertically over the pin. To maintain the axial alignment of the lock bars 102 and 103, an alignment pin 110 extends between the bars and is slidable within axial bores 111 and 112.

The combination lock mechanism 99 is contained within and acessible through a housing indicated generally by the numeral 115. This housing 115 comprises a sheet metal pocket 116 that receives a liner 114 of drill resistent material, and a pair of sheet metal lids or covers 120 and 121. The liner completely surrounds the combination lock mechanism 99 and is made from two pieces; a generally box shaped section 117 and a removable rear cover 118.

As may be seen most clearly in FIGURE 6, the pocket section 116 of the housing 115 is fixedly attached to the rear of the front plate 31 of the door. The sides of the housing are provided with apertures 119—119 through which the lock bars 102 and 103 extend. Coaxial apertures are also provided in the liner to accommodate the lock bars 102 and 103. The liner support pocket 116 is deeper or extends rearwardly further than the rear cover plate 33 of the door and therefore, the rear cover plate 33 is provided with an aperture through which the pocket extends.

The liner cover 118 is supported in the pocket 116 outside the door chamber 36 or in that portion of the pocket located behind the door cover plate 33 so that it may be removed without removing the rear cover plate 33 of the door. To secure the liner cover 118 against removal by unauthorized personnel, while facilitating removal by authorized personnel for purposes of changing the combination of the lock, the liner cover is retained in the pocket 116 by the pair of lids or covers 120, 121. These covers are both mounted upon the rear of the rear cover plate 33 of the door and cooperate with the metal pocket 115 to completely enclose the drill resistent liner in the sheet metal enclosure.

The inner cover 120 is mounted upon the rear cover plate 33 of the door by a horizontal hinge 122 such that the lid 120 may be lifted vertically to open.

To secure or lock the inner lid 120 closed, a detent pin 125 is cooperable with a depending flange 123 on the lid. This pin 125 is mounted within a U-shaped bracket 126 attached to the rear cover plate 33 of the door beneath the hinge 122. A pair of legs 124–131 of the bracket 126 extend rearwardly from the back of the door and support the pin 125 for sliding movement within apertures contained therein.

The pin 125 comprises a pair of enlarged end sections 127 and 128 separated by a smaller diameter intermediate section 129. A compression spring 130 is located between the enlarged inner end section 127 of the pin and one leg 131 of the bracket 126 so as to bias the pin 125 to a position in which the enlarged and knurled outer end section 128 of the pin engages the opposite surface of the leg 131 of the bracket 126.

As may be seen most clearly in FIGURE 13, the depending flange 123 is a part of a right angle bracket secured to the bottom of the lid 120. This flange must clear the inner end 134 of the detent pin 125 in order for the lid 120 to open or close. To open or close the lid 120, the detent pin 125 must be grasped at the knurled outer end 128 and pulled outwardly against the bias of the compression spring 130 to a non-blocking position in front of the flange 123.

The second cover or lid 121 is mounted for pivoting movement about a vertical hinge 135 on the rear door cover plate 33. When closed, this lid covers both the sheet metal pocket 116 and the inner lid 120 so that the cover 121 acts as a door to prevent access to the inside cover 120 except when the file door 30 is open and the door bolts 51, 52, 53, 54 are extended to a locked position.

As may be seen most clearly in FIGURE 13, the outer cover 121 comprises a box in the form of a front wall 136, a pair of side walls 137, 138, a top wall 139, and a bottom wall 140. A locking bracket 141 forms an extension of the side wall 138 and has an outwardly extending flange or locking dog 142 at its outer end. This bracket extends through a notch or recess 143 in the rear cover plate 33 of the door when the cover 121 is closed.

As may be seen most clearly in FIGURES 10 and 13, a lock bar 149 is slidable behind locking dog 142 of the closed cover 121 to secure the cover 121 in a locked condition. The lock bar 149 extends through and is slidable within an aperture 150 in the side channel 32 of the door. Outside the door, the bar 149 is bent rearwardly so as to form a flange or tongue 151 which may be pulled outwardly when the door is open to unlock the outer cover 121. An abutment screw 148 is threaded into a bar 149 in a position to engage the inside edge of the side channel 32 of the door and limit outward movement of the bar. The lock bar 149 is preferably biased into a locked condition and to this end, a tension spring 153 extends between an aperature in the bar 149 and an aperture 154 in a bracket 155 secured to the front plate of the door. The bracket 155 also supports a pair of vertical guide channels 156, 157 between which the lock bar 149 is slidable.

To insure that the cover 121 is never left in a partially open position when the door 30 is closed, a protrusion or abutment 144 is welded to the bracket 141 in a position adjacent the flange 142. As may be seen most clearly in FIGURE 10, the protrusion 144 normally resides within the door chamber 36 in a non-blocking position relative to the door carrying bar 50 when the cover 121 is closed. Should the cover be left partially open or ajar such that the lock bar 149 is in front of the bracket or lock dog 142 rather than behind it, the protrusion 144 will engage and preclude the carrying bar 50 from being moved inwardly to a door unlocked position and therefore the extended door bolts will preclude the door from being closed.

As a further safeguard against unauthorized opening of the cover 121, a door bolt interlock 160 is operable to prevent the cover 121 from being opened except when the bolts of the door are thrown to a locked position. This interlock thus insures that the door must be open and the bolts thrown to the locked condition before the cover 121 may be opened. It also serves the additional function of preventing the door bolts 51–54 from being thrown to a locked position when the door is standing open so as to interfere with closing of the door.

As may be seen most clearly in FIGURES 4 and 7, the door bolt interlock 160 comprises a pivotally mounted locking dog 161 engageable with the vertical carrying bar 50 of the door boltwork to prevent the door bolt from being moved outwardly to a locked position except when a control rod 163 is forced inwardly against the bias of a spring 164. The spring 164 is connected at one end to a washer attached to the rod and at its opposite end to the bottom 159 of the pocket 116. When the door is closed, the control rod 163 engages the door jamb defining channel 21 of the file cabinet and is forced to the right as viewed in FIGURE 7. As it moves to the right, it carries with it a swivel block 167 pivotally attached to the locking dog 161. The inward or rightward movement of the control rod thus causes the locking dog 161 to be pivoted about the stationary pivot shaft 162 and moved to the non-blocking position shown in phantom in FIGURE 7. In this position of the dog 161, the door bolts may be thrown to the locked condition.

To open the outer cover 121 of the combination lock enclosure, the end 170 of the control rod 163 must be manually pushed inwardly against the bias of spring 164 so as to cause the bracket 161 to be moved to a non-blocking position relative to the bar 50. In this position of the control rod, the weight of the door bolt linkage system is sufficient to cause the carrying bar 50 and door bolt 51 to be moved to an extended position. Thereafter, the tongue 151 of the locking bar 149 may be pulled outwardly so as to permit the outer cover 121 to be opened. With the outer cover 121 opened, the inner cover is accessible and by grasping the knurled end of the detent pin 125 and pulling it outwardly, the inner end 134 of the pin may be moved to a non-blocking position relative to the depending bracket 133 on the lid 120. The lid may then be lifted to an open position such that the cover of drill resistent material 118 may be removed from the sheet metal pocket 115. The combination lock setting mechanism of the combination lock is then accessible and the combination may be changed.

To insure that the cover 118 is replaced and not inadvertently left out of the sheet metal pocket or surreptitiously stolen from the pocket, a large diameter hole or window 171 is provided in the outer cover 121 such that the absence of the cover of drill resistent material is detectable even though the outer cover may be closed.

One of the primary advantages of this double cover arrangement over the combination lock is that it affords protection against a successful surreptitious attack on the lock through either the front or back of the file cabinet. Specifically, a successful attack cannot be accomplished by inserting a tool through a small hole in the cabinet and forcing the outer door open and then dumping the liner cover 118 from the pocket by turning the file upside down.

While only a single preferred embodiment of this invention has been disclosed and described herein, those skilled in the art to which this invention pertains will readily appreciate numerous changes and modifications which may be made without departing from the spirit of my invention. Therefore, I do not intend to be limited except by the scope of the appended claims.

Having described my invention, I claim:

1. A security file comprising
- a metal cabinet having a pair of side walls, a rear wall, a top wall, and a bottom wall defining an enclosure,
- a door pivotally mounted upon said cabinet and at least partially defining a front wall, said door having one hinged side and one swingable side located opposite the hinged side,
- at least two door bolts extensible from said swingable side of said door and cooperable with a fixedly mounted portion of said cabinet to secure said door in a locked condition,
- a first vertically extending metal carrying bar interconnecting said door bolts, said first carrying bar being laterally movable to move said door bolts between extended and retracted positions,
- second and third bars pivotally connected at one end to said first bar,
- a fourth bar pivotally connected to the opposite ends of said second and third bars,
- said first, second, third, and fourth bars being interconnected so as to form a first parallelogram linkage network,
- a second linkage network including a door handle for controlling movement of said parallelogram linkage network and thus the door bolts, and
- a lock mounted upon said door and having a lock bolt movable into a blocking position relative to one of said linkage networks when said door is locked so as to maintain said door in the locked condition.

2. The security file of claim 1, wherein each of said bars comprises a relatively long, narrow strip of metal having the long and narrow dimensions located in a plane parallel to the plane of the door of the file.

3. The security file of claim 2 wherein each of said bars of said first linkage network is pivotally interconnected by a rivet.

4. The security file of claim 1 wherein parallel fifth and sixth bars are pivotally connected at one end to said opposite ends of said second and third bars, respectively, the other ends of said fifth and sixth bars each being pivotally connected to a stationary pivot.

5. The security file of claim 4 wherein said second linkage network comprises a pair of parallel linkage elements located parallel to said second and third bars, a vertical link connected to one end of each of said pair of parallel linkage elements, said handle being connected to the opposite end of one of said pair of parallel linkage elements.

6. A security file comprising
- a metal cabinet having a pair of side walls, a rear wall, a top wall, and a bottom wall defining an enclosure,
- a door pivotally mounted upon said cabinet and at least partially defining a front wall, said door having one hinged side and one swingable side located opposite the hinged side,
- at least two door bolts extensible from said swingable side of said door and cooperable with a fixedly mounted portion of said cabinet to secure said door in a locked condition,
- a first vertically extending metal carrying bar link interconnecting said door bolts, said first carrying bar being laterally movable to move said door bolts between extended and retracted positions,
- a pair of vertically spaced toggle linkages connected to said carrying bar, each of said toggle linkages comprising a pair of pivotally connected links, one of each pair of links being connected at one end to said carrying bar and at the other end to one end of the other one of said pair of links, the other end of said other one of said pair of links being pivotally attached to a stationary pivot,
- a first vertical link interconnecting the common pivots between each pair of links such that the pair of toggle linkages move in unison,
- a linkage system including a door handle and at least one connecting link for controlling movement of said toggle linkages, and
- a lock mounted upon said door and having a lock bolt movable into a blocking position in which it prevents retraction of said door bolts when said door is locked.

7. A security file comprising
- a metal cabinet having a pair of side walls, a rear wall, a top wall, and a bottom wall defining an enclosure,
- a door pivotally mounted upon said cabinet and at least partially defining a front wall, said door having boltwork mounted thereon and operable to secure said door in a locked condition,
- a lock mounted upon said door having a lock bolt operable to secure said boltwork in a locked condition,
- the improvements within said pair of side walls and top wall are formed from a single unitary sheet of metal, the front edge portions of said side walls having a first 90° bend inwardly, a second 90° bend rearwardly, a third 90° bend outwardly which cooperatively define a double reversely bent front corner structure, said double reversely bent front corner structure defining the vertical side edges of the door jamb of said cabinet, and
- a vertically extending sheet metal pocket secured within both of the double reversely bent front corner structures and a strip of drill resistant material secured within each of said pockets.

8. The security file of claim 7 wherein said top wall has a first 90° bend downwardly, a second 90° bend rearwardly, and a third 90° bend outwardly which cooperatively define a double reversely bent top door jamb of said cabinet.

9. A security file comprising
a metal cabinet having a pair of side walls, a rear wall, a top wall, and a bottom wall defining an enclosure,
a door pivotally mounted upon said cabinet and at least partially defining a front wall,
boltwork including at least two door bolts mounted upon said door and operable to secure said door in a locked condition,
a combination lock mounted upon said door and having a lock bolt movable into blocking position relative to said combination lock comprising a manual actuator mounted exteriorly of said door and a lock mechanism mounted interiorly of said door,
a cover over said lock mechanism operable to preclude unauthorized tampering with the lock while permitting access for purposes of changing the combination, the improvement wherein said cover comprises
an enclosure having a liner of drill resistant material located therein, said liner having one removable section, a hinged lid on said enclosure operable when closed to retain said removable liner section within the enclosure, and
an interlock engageable with said lid to retain said lid in a locked condition so long as said door is closed.

10. A security file comprising
a metal cabinet having a pair of side walls, a rear wall, a top wall, and a bottom wall defining an enclosure,
a door pivotally mounted upon said cabinet and at least partially defining a front wall,
boltwork including at least two door bolts mounted upon said door and operable to secure said door in a locked condition,
a combination lock mounted upon said door and having a lock bolt movable into blocking position relative to said boltwork to secure said boltwork in locked condition, said combination lock comprising a manual actuator mounted exteriorly of said door and a lock mechanism mounted interiorly of said door,
a cover over said lock mechanism operable to preclude unauthorized tampering with the lock while permitting access for purposes of changing the combination, the improvement wherein said cover comprises
an enclosure having a liner of drill resistant material located therein, said linear having one removable section, an inner hinged lid operable when closed to retain said removable liner section within the enclosure, an outer hinged lid movable over said first hinged lid, and an interlock bar engageable with said outer lid to retain said lid in a locked condition so long as said door is closed.

11. The security file of claim 10 wherein a spring biased plunger is engageable with said inner lid to retain said inner lid closed.

12. The security file of claim 10 wherein said interlock bar is mounted for sliding movement between a locked position in which one end is located between one edge of the door and the door jamb of the cabinet and an open position in which said one end is spaced outwardly from said one edge of said open door.

13. The security file of claim 10 which further comprises an interlock mechanism operable to retain said outer lid in a locked condition until the boltwork of the door is moved to a locked condition.

14. A security file comprising
a metal cabinet having a pair of side walls, a rear wall, a top wall, and a bottom wall defining an enclosure,
a door pivotally mounted upon said cabinet and at least partially defining a front wall,
boltwork including at least two door bolts mounted upon said door and operable to secure said door in a locked condition,
a combination lock mounted upon said door and having a lock bolt movable into blocking position relative to said boltwork to secure said boltwork in locked condition, said combination lock comprising a manual actuator mounted exteriorly of said door and a lock mechanism mounted interiorly of said door,
a cover over said lock mechanism operable to preclude unauthorized tampering with the lock while permitting access for purposes of changing the combination, the improvement wherein said cover comprises
an enclosure having a liner of drill resistant material located therein, said liner having one removable section, a hinged lid on said enclosure operable when closed to retain said removable liner section within the enclosure, and
means operable to retain said lid in a locked condition until said door is open and said boltwork is moved to a door locked position.

References Cited

UNITED STATES PATENTS

| | | | |
|---|---|---|---|
| 1,707,481 | 4/1929 | Johnsen | 109—63.5 |
| 2,591,172 | 4/1952 | Lundine | 312—329 |
| 2,947,160 | 8/1960 | Wolters | 109—59 |
| 2,956,525 | 10/1960 | Blauvelt | 109—59 |
| 2,996,322 | 8/1961 | McClellan | 109—59 |

REINALDO P. MACHADO, *Primary Examiner.*

UNITED STATES PATENT OFFICE

CERTIFICATE OF CORRECTION

Patent No. 3,418,951 December 31, 1968

Leland W. Belew

It is certified that error appears in the above identified patent and that said Letters Patent are hereby corrected as shown below:

Column 1, line 28, "record" should read -- record safes --. Column 8, line 65, "rearwardly, a" should read -- rearwardly, and a --. Column 9, line 14, "to said combination" should read -- to said boltwork to secure said boltwork in locked condition, said combination lock --.

Signed and sealed this 17th day of March 1970.

(SEAL)
Attest:

Edward M. Fletcher, Jr.
Attesting Officer

WILLIAM E. SCHUYLER, JR.
Commissioner of Patents